No. 766,065. Patented July 26, 1904

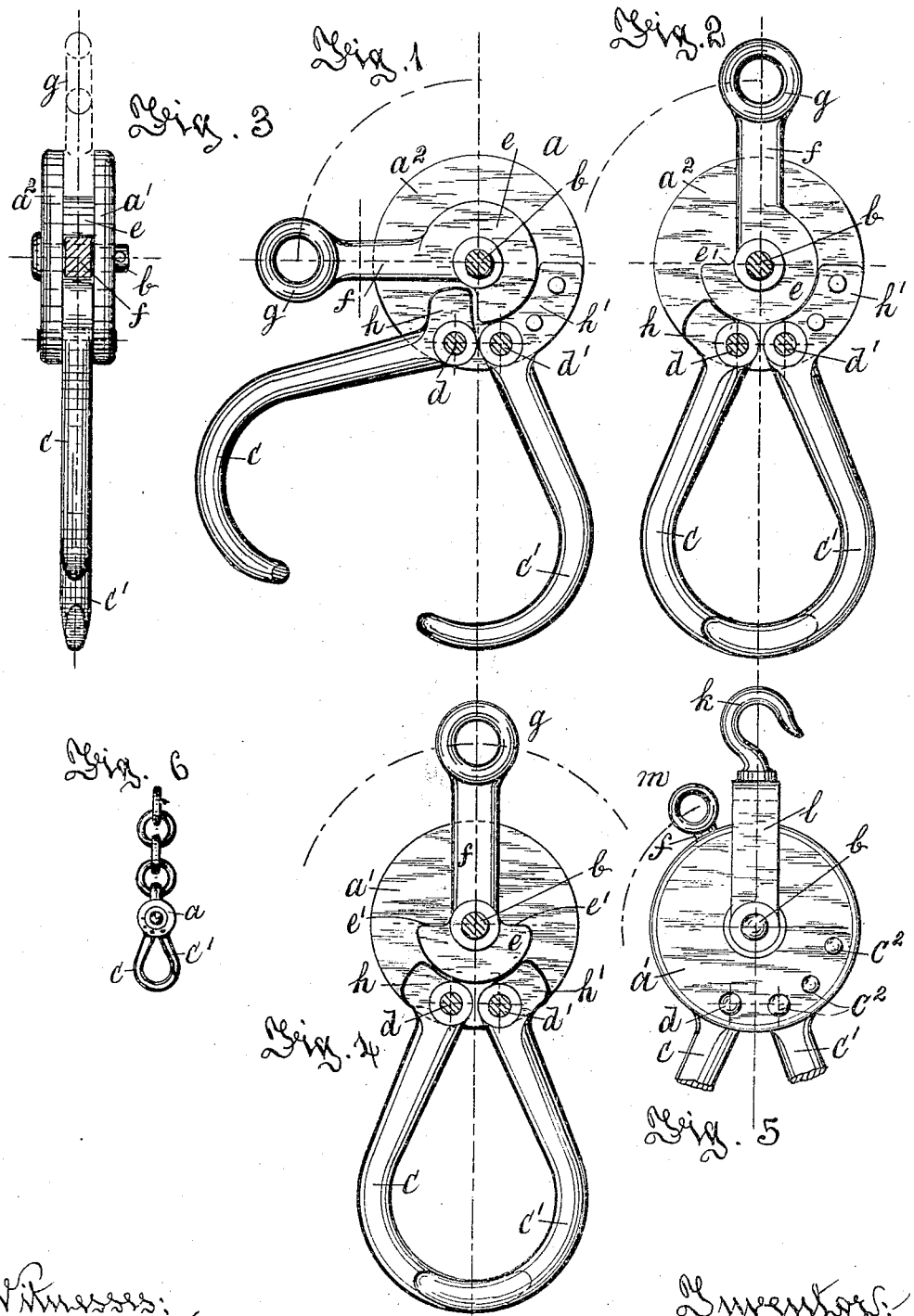

UNITED STATES PATENT OFFICE.

WILLIAM ROBSON, OF KELSO, SCOTLAND.

SHACKLE-HOOK.

SPECIFICATION forming part of Letters Patent No. 766,065, dated July 26, 1904.

Application filed December 7, 1903. Serial No. 184,201. (No model.)

*To all whom it may concern:*

Be it known that I, WILLIAM ROBSON, a subject of the King of Great Britain, residing at Grove Hill, Kelso, in the county of Roxburgh, Scotland, have invented new and useful Improvements in Shackle-Hooks, of which the following is a specification.

My invention relates to improvements in shackle-hooks in which the suspending-hook is made in two parts pivoted together, the two parts when brought together forming a hook to which any weight can be suspended or attachment made, while when the two parts of the hook are separated the weight can be removed; and the object of my invention is to provide for the ready locking together and unlocking the two parts of the hook in their closed and opened positions. I attain this object by the mechanism illustrated in the accompanying drawings, in which—

Figure 1 is a front view of the shackle-hook open and unlocked. Fig. 2 is a similar view showing the hook closed and locked. Fig. 3 is a side view of Fig. 1. Fig. 4 is a front view of a hook, showing both halves of the hook pivoted to open and close. Fig. 5 shows the arrangement illustrated in Figs. 1 and 2, but with a hook for its suspension. Fig. 6 shows the invention applied to a catch-hook for a watch-chain.

Similar letters refer to similar parts throughout the several views.

$a$, Figs. 1 and 2, is a center or case consisting of two parallel disks $a'$ $a^2$, connected by a strong central pin $b$. The suspending-hook hung from these disks consists of two hooks $c$ $c'$, the parts of which fit side by side, so as to form a single closed hook when brought together, as shown in Fig. 2, while one of them, $c$, can be opened out to a sufficient angle to allow any weight hung upon it to be removed, as shown in Fig. 1.

$d$ $d'$ are strong pivots passing through and fixed at the lower edge of the disks $a'$ $a^2$, the hook $c$ being suspended upon the pivot $d$ and the hook $c'$ being suspended upon the pivot $d'$.

Upon the center pin $b$, between the two disks $a'$ $a^2$, is pivoted a plate or segment of a disk $e$, provided with an arm $f$, projecting sufficiently up above the disks and having an eye $g$, by which the entire device can be attached to or suspended from a chain or other support.

The short upper ends or arms of the hooks $c$ $c'$ above the pivots $d$ $d'$ and between the disks are bent out and curved at $h$ $h'$, so that their outer edges when the hooks are closed together are concentric and level with the edge of the disks $a'$ $a^2$, while their inner edges are concentric with and fit against the circular part of the pivoted plate or segment of a disk $e$, and in this position, as shown in Fig. 2, it is impossible for the two parts $c$ $c'$ of the hook to separate or become open. The pivoted plate $e$ has, however, part of its circumference cut out, as shown at $e'$, in such way and to such an extent that when it is turned sufficiently round on the pin $b$, as shown in Fig. 1, the upper end $h$ of the hook $c$ can fall into the notch, and the hook is opened, as shown. The other half, $c'$, of the double hook is shown rigidly fixed between the disks $a$ $a'$, to which its upper arm $h'$ is riveted or bolted, as shown at $c^2$. Both halves of the double hook may be pivoted, so that normally they are kept firmly closed together, as shown in Fig. 4, while either half can be allowed to open when desired by turning the pivoted plate $e$ to the right or left upon the pin $b$, the plate being cut away for the purpose, as shown.

In order to turn the plate $e$ sufficiently round on the pin $b$ to release one of the hooks, I form at the upper end of the bar $f$ an eye or hook $g$, by which the apparatus can be attached to a hook, rope, or other support. By relieving the hooks $c$ $c'$ of the weight hanging to them and turning down the bar or arm $f$ the part $c$ of the hook is turned upon its center and opened, as shown in Fig. 1. As, however, it is generally required to open the double hook without turning down the entire apparatus, as in Fig. 1, the modification of Fig. 1 shown in Fig. 5 may be used, in which the apparatus is suspended or attached by a swivel-hook $k$ upon a strap $l$, fitting across the upper edge of the plates $a$ $a'$ and pivoted on the center $b$, the plate $e$ being pivoted (as before) upon $b$ between the plates $a'$ $a^2$ and having a projecting eye or handle $m$, by which it can be readily turned round sufficiently when required. An ordinary spring-catch may be used to retain the plate e in either of its positions.

The apparatus may be applied to the purposes for which such opening and closing hooks are ordinarily used, and it may be made of any size and strength. Fig. 6 shows it in very small size for attaching a watch to a chain, for instance, the construction being the same as shown in Figs. 1 and 2.

Having fully described my invention, what I claim, and desire to secure by Letters Patent, is—

1. A shackle-hook, comprising a body portion, a pair of grappling members mounted thereon, and a locking-lever independent of the supporting-chain pivoted to said body portion and adapted to lock said grappling members, substantially as described.

2. A shackle-hook, comprising a body portion, a pair of grappling-hooks mounted thereon, and a locking-lever independent of the supporting-chain pivoted to said body portion and adapted to lock said grappling-hooks in a closed position.

3. A shackle-hook, comprising a body portion, a pair of grappling-hooks mounted thereon, and a locking-lever independent of the supporting-chain pivoted to said body portion and provided with a cut-away portion adapted to unlock said grappling-hooks when moved from one position to another.

4. In a shackle-hook, the combination of side plates, a pair of grappling-hooks depending from said side plates, and a locking-lever provided with a cut-away portion, pivoted between said side plates and adapted to lock said grappling-hooks in a closed position.

5. In a shackle-hook the combination of side plates, a locking-lever provided with a cut-away portion, pivoted centrally between said side plates, a stationary hook secured between the lower part of said side plates, a swinging hook pivotally mounted opposite said stationary hook, provided with a lug adapted to engage with said cut-away portion in said locking-lever when in the open position.

6. A shackle-hook comprising side plates, a plurality of overlapping grappling members depending therefrom, and means movably connected to said plates, constructed to lock said members in overlapped position when placed substantially in the line of pull, and to release said members from such position when placed substantially at right angles to the line of pull.

7. A shackle-hook comprising side plates, a pair of overlapping grappling-hooks depending therefrom, and a lever pivoted between said plates, constructed to lock said members in overlapped position when placed substantially in the line of pull, and to release said members from such position when placed substantially at right angles to the line of pull.

8. A shackle-hook comprising side plates, a plurality of overlapping grappling-hooks depending therefrom, and a lever pivoted between said plates and provided with an enlarged portion adapted to lock said hooks in overlapped position when placed substantially in the line of pull, and also provided with a cut-away portion into which one of said hooks may be lifted to release said hooks from such position when said lever is placed substantially at right angles to the line of pull.

In witness whereof I have hereunto set my hand in the presence of two witnesses.

WILLIAM ROBSON.

Witnesses:
ALFRED T. BRATTON,
H. D. JAMESON.